United States Patent [19]
Trabandt et al.

[11] Patent Number: 5,549,146
[45] Date of Patent: Aug. 27, 1996

[54] VEHICLE TIRE WITH WIPER RIB MEMBER

[75] Inventors: Hagen Trabandt, Sehnde; Uwe Ramcke, Walsrode, both of Germany

[73] Assignee: Continental Aktiengesellschaft, Hanover, Germany

[21] Appl. No.: 414,016

[22] Filed: Mar. 30, 1995

[30] Foreign Application Priority Data

Mar. 30, 1994 [DE] Germany ............................ 44 10 999.7

[51] Int. Cl.$^6$ .............................. B60C 11/13; B60C 11/24
[52] U.S. Cl. .................................... 152/154.2; 152/209 R; 152/DIG. 1
[58] Field of Search ........................... 152/209 R, 209 D, 152/DIG. 1, 154.2

[56] References Cited

U.S. PATENT DOCUMENTS

| | | |
|---|---|---|
| 2,265,543 | 12/1941 | Overman . |
| 2,706,509 | 4/1955 | White ..................... 152/154.2 |
| 3,727,661 | 4/1973 | Hoke . |
| 4,345,632 | 8/1982 | Takigawa et al. . |
| 4,412,576 | 11/1983 | Nakajima .............................. 152/209 R |
| 5,160,385 | 11/1992 | Goto et al. ......................... 152/DIG. 1 |
| 5,417,269 | 5/1995 | Kinoshita et al. .................. 152/209 R |

FOREIGN PATENT DOCUMENTS

| | | |
|---|---|---|
| 0499933 | 8/1992 | European Pat. Off. . |
| 1163341 | 9/1958 | France . |
| 2470696 | 6/1981 | France . |
| 3727050 | 2/1989 | Germany ............................ 152/209 R |
| 134314 | 6/1988 | Japan ................................ 152/209 R |

*Primary Examiner*—Steven D. Maki
*Attorney, Agent, or Firm*—Robert W. Becker & Associates

[57] ABSTRACT

A pneumatic vehicle tire has a tire tread with circumferential grooves. Each one of the circumferential grooves has a groove base and groove flanks. At least one of the circumferential grooves has a wiper rib member connected integrally to the groove base and extending over the entire circumferential length of the circumferential groove such that the wiper rib member is connected to the groove base but is separate from the groove flanks. The wiper member has, when viewed radially outwardly, a lower portion and an upper portion, wherein the upper portion is divided by transverse grooves into member sections and the lower portion is continuous in the circumferential direction. The transverse grooves are slanted at an angle of 10° to 40° relative to the axial direction. The transverse grooves comprise a first set and a second set, with the transverse grooves of the first set oriented opposite to the transverse grooves of the second set. The transverse grooves of the first set alternate with the transverse grooves of the second set such that the member sections of the wiper rib member have a trapezoidal contour.

4 Claims, 5 Drawing Sheets

Prior Art

VEHICLE TIRE WITH WIPER RIB MEMBER

BACKGROUND OF THE INVENTION

The present invention relates to a vehicle tire, a pneumatic vehicle tire in particular, especially for utility vehicles, with a tread that is provided with circumferential grooves, at least one of which is provided with a wiper rib member that extends around its entire circumference. A wiper rib member is a stay that is located approximately at the center of the base of the circumferential groove(s) and is designed to be integrally connected radially inwardly to the rest of the tread but not laterally. The wiper rib member, when viewed radially outwardly, is provided with two different portions; the upper portion of the wiper rib member is divided by grooves basically extending axially, whereas the wiper rib member is continuous in its lower portion.

Particularly with pneumatic vehicle tires for trucks the problem is known that stones or pebbles of a considerable weight can get stuck in the grooves that serve for draining water from the tread. The mastication on entering the contact patch favors a picking up of stones and their gradual transport radially inwardly. The migration of the stones can continue down to the base of the grooves, and the stones can even gradually penetrate the overlay provided on top of the belt plies.

In order to prevent such damages, many different measures have already been known. Among those, the simplest seems to be to incline the groove flank to a great extent relative to the radial such that the grooves significantly enlarge outwardly. However, this measure has the disadvantage that a considerable difference in the groove width across the radial is created, particularly in the case of the great tread depth of truck tires, usually 22 mm. This leads to the effect that the groove width of the tire as manufactured is unnecessarily large, the remaining tread positive unnecessarily small, and thus the decline of the tread depth during its lifetime is unnecessarily great. Economic efficiency, however, is of the greatest importance for the customer in this market sector.

Therefore, it is common to design the groove flanks to be significantly steeper; the common flank gradient relative to the radial ranges between 3° and 6°.

However, in order to prevent damage to the belt plies by penetrating stones, it is common to provide an additional protuberance, called wiper rib member, at the base of the groove. There seems to be consent among the important tire manufacturers that wiper rib members operate satisfactorily. However, there is still a dissent in regard to the optimal design.

The two designs which are mostly known on the market are illustrated in FIGS. 1a and 1b, which belong together, and as well in FIGS. 2a and 2b which belong together. With the design schematically illustrated in FIGS. 1a and 1b, the wiper rib member is continuous over the tire circumference, whereas with the designs schematically illustrated in FIGS. 2a and 2b, the wiper rib member is divided by small transverse grooves (8). Furthermore, a combination of these two designs is known from French Patent 1,163,341.

U.S. Pat. 2,265,543 illustrates in FIG. 3 trapezoid-shaped wiper webs/wiper rib members 12. Between each two wiper webs 12 a trapezoid-shaped protuberance 11 is provided, each of which, radially inwardly and with one of its two sides, engages the positive engaging the road surface. The spacing between each two protuberances 11 which are sequently arranged in the circumferential direction and are located within the same circumferential groove, is larger than the circumferential extension of each protuberance 11.

In both of the aforementioned FIGS. 1a, 1b and 2a, 2b representing the prior art as well as in the following FIGS. 3–6 which illustrate the present invention, the vehicle tire is labeled as 1, the groove, preferably the circumferential groove that is to be protected, is labeled as 3, and the wiper rib member that is provided at the base 4 of the groove 3, is labeled as 5. The transverse grooves which divide the wiper rib member 5 are labeled as 8.

The object of the present invention is to improve the design of the wiper rib members known per se, also in regard to the related noise development.

SUMMARY OF THE INVENTION

A pneumatic vehicle tire according to the present invention is primarily characterized by:

a tire tread comprising circumferential grooves extending in the circumferential direction of the tire;

each one of the circumferential grooves having a groove base and groove flanks;

at least one of the circumferential grooves comprising a wiper rib member connected integrally to the groove base and extending over the entire circumferential length of the circumferential groove such that the wiper rib member is connected in the radial direction of the tire to the groove base but is separate from the groove flanks in the axial direction of the tire;

the wiper member having, when viewed radially outwardly, a lower portion and an upper portion, wherein the upper portion is divided by transverse grooves into member sections and the lower portion is continuous in the circumferential direction;

wherein the transverse grooves are slanted at an angle of 10° to 40° relative to the axial direction;

wherein the transverse grooves comprise a first set and a second set, with the transverse grooves of the first set oriented opposite to the transverse grooves of the second set; and wherein in the circumferential direction the transverse grooves of the first set alternate with the transverse grooves of the second set such that the member sections of the wiper rib member have a trapezoidal contour.

Preferably, the height of the wiper rib member measured from the groove base radially outwardly is 15% to 35% of a maximum groove depth.

Advantageously, the height of the lower portion of the wiper rib member measured from the groove base radially outwardly is 5% to 20% of a maximum groove depth.

In a preferred embodiment of the present invention, the height of the lower portion of the wiper rib member measured from the groove base radially outwardly is 1.8 mm and wherein the lower portion serves as a tread wear indicator.

Expediently, the wiper rib member has flanks having a slant such that the wiper rib member tapers radially outwardly, wherein a slant angle of the flanks relative to the radial direction is between 0° and 30°.

In another embodiment of the present invention, the circumferential grooves extend in a zigzag pattern so as to comprise groove portions that are offset at an offset location in the axial direction relative to a circumferential center line of the circumferential grooves and comprise slanted areas extending at a slant to the circumferential center line. At each one of the offset locations one of the transverse grooves is arranged such that at the offset locations the transverse grooves and the slanted areas are aligned with one another along a common line acting as a hinge axis about which a bending softness of the circumferential grooves is increased.

The present invention is primarily characterized in that the basically transverse grooves dividing the upper portion of the wiper rib member are inclined at an angle between 10° and 40° relative to the axial direction of the tire; it is further characterized in that the orientation of the transverse grooves dividing the upper portion of the wiper rib member alternates from groove to groove relative to the axial direction such that the member sections into which the upper portion of the wiper rib member is divided are trapezoid-shaped.

In contrast to a wiper rib member that is continuous, the inventive wiper rib member occupies less groove void volume, i.e., it has a lower impact on the water drainage in a greatly worn condition of the tire. However, the stone clearing action is undiminished. In comparison to a divided wiper rib member having transverse grooves that reach to the base of the groove, the remaining draining volume of the inventive tire is slightly smaller. However, the mechanical load, particularly the pull-off resistance is substantially increased. It has been shown that a considerable stress load is created at the base of a wiper rib member, even though it does not come into contact with the street surface, and with the prior art embodiment of divided wiper rib members this stress load adds to the stress within the base of the groove.

With the inventive design, however, the two alternating stress folds are separated in the radial direction such that the resulting maximum stress is smaller. In conjunction with the lowered bending resistance of the divided wiper rib member the resulting stress load, in analogy to raw-edged V-belts, is reduced in comparison to a continuous wiper rib member.

The inventively alternating orientation of the transverse dividing grooves renders the changes of the described mechanical alternating stress fields more uniform and thus increases the pull-off resistance without diminishing the stone clearing action.

The wiper rib member is preferably dimensioned such that the total height (H) of the wiper rib member (5), measured from the base (4) of the circumferential groove (3) is 15% to 35% of the maximum groove or tread depth (T).

In order to separate overlapping stress fields to a sufficiently wide extent, on the one hand, and to keep the volume of the wiper rib member and its bending resistance in the circumferential direction sufficiently small, on the other hand, it is advisable to dimension the height of the lower portion, in which the wiper rib member is not divided by a groove, such that it ranges between 5% and 20% of the maximum tread depth. Such a dimensioning is particularly advantageous in an embodiment in which the height of the lower portion in which the wiper rib member is not divided by a groove, is 1.8 mm and thus acts as a tread wear indicator (TWI).

In order to provide an inventive wiper rib member with a high resistance at a small volume, it is furthermore advisable to design the wiper rib member in cross-section with a flank gradient such that it tapers radially outwardly and the flank rake relative to the radial ranges between 0° and 30°.

In a further embodiment of the tire with transverse dividing grooves that, according to the invention, divide only the upper portion of the wiper rib member, and with circumferential grooves extending in a zigzag pattern that is known per se, it is suggested that one of the inventive transverse grooves dividing the upper portion of the wiper rib member is provided at each offset location of such a zigzag-circumferential groove. The inventive transverse grooves are designed to be aligned with the slanted areas (offset portions) and thus create common lines acting as a hinge axis for increasing the bending resistance at the offset locations. The flexibility thus concentrated results in a particularly favorable ejection action with respect to the stones which accidentally get stuck at such a dividing location of a wiper rib member.

BRIEF DESCRIPTION OF THE DRAWINGS

The object and advantages of the present invention will appear more clearly form the following specification in conjunction with the accompanying drawings 3a to 6, in which:

FIG. 3b illustrates a cross-section of the same tire area as in FIG. 3a;

DESCRIPTION OF PREFERRED EMBODIMENTS

Figure 1A:
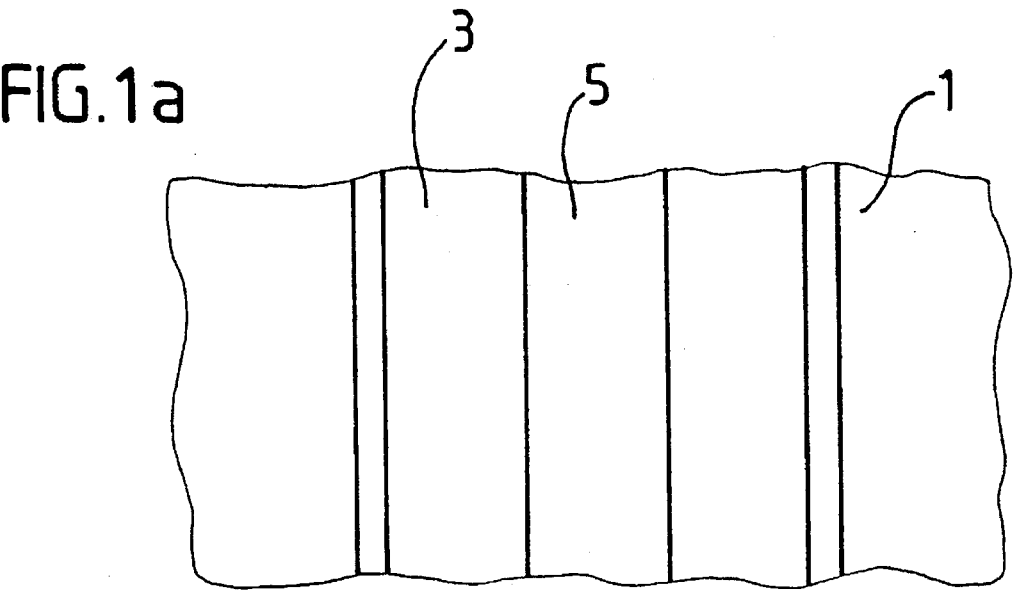
FIG. 1a is a plan view of a prior art wiper rib member.
Figure 1B:
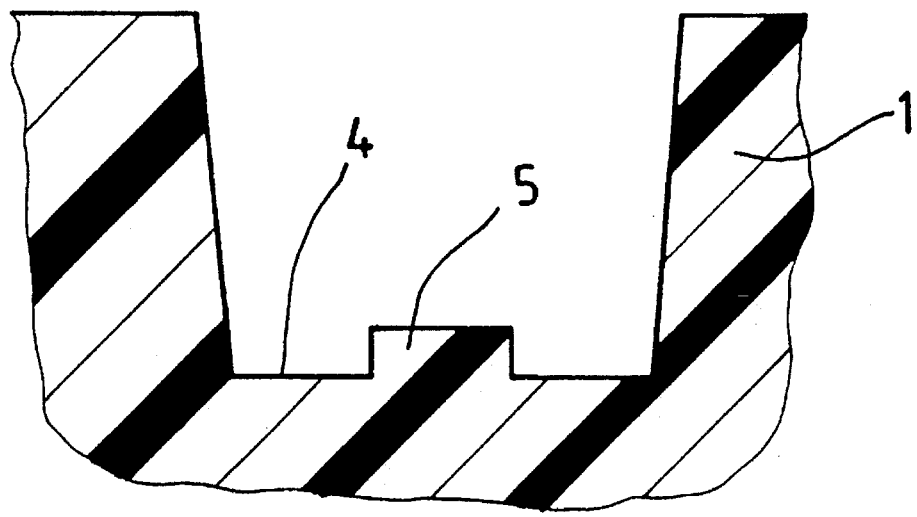
FIG. 1b is a cross-section of a prior art wiper rib member.
Figure 2A:
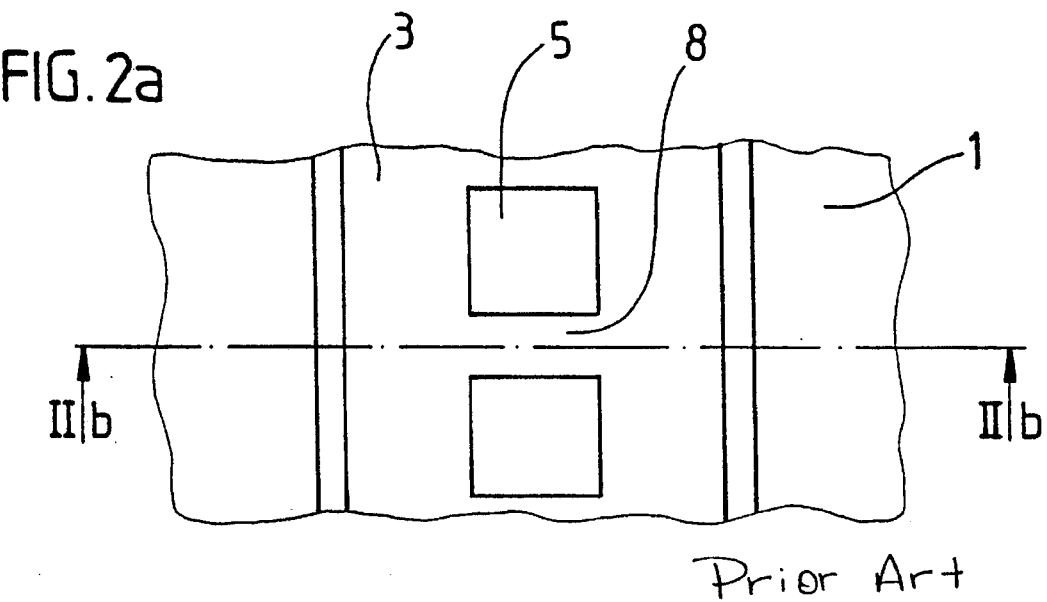
FIG. 2a is a plan view of a prior art wiper rib member.
Figure 2B:
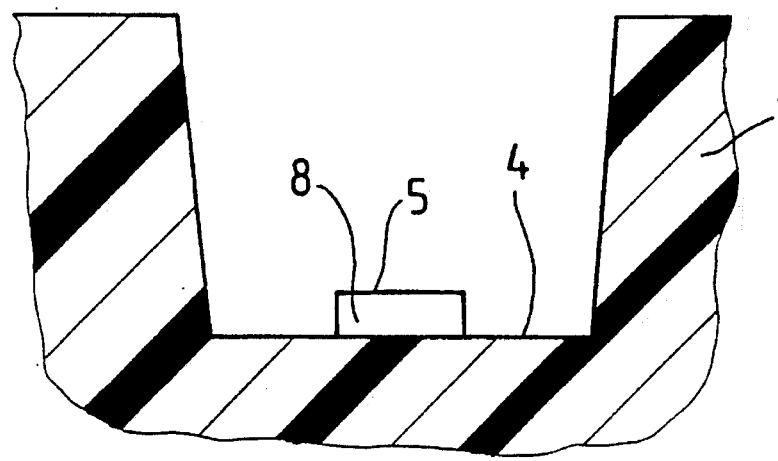
FIG. 2b is a cross-section of a prior art wiper rib member.
Figure 3A:
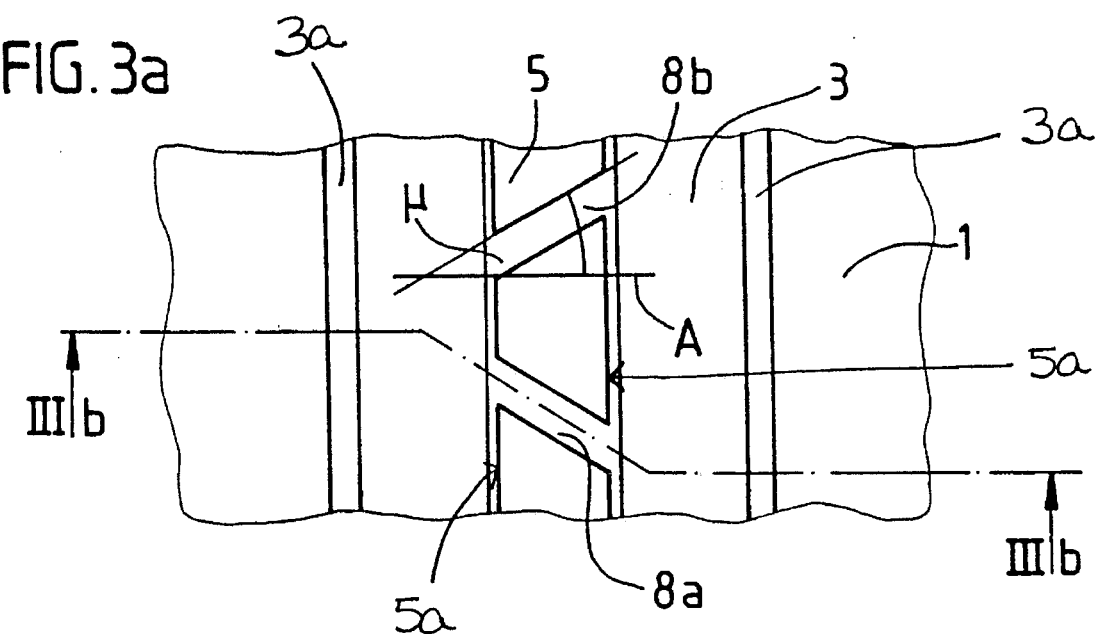
FIG. 3a illustrates a plan view of an inventive tire.

FIG. 3a illustrates a plan view of a section of an inventive tire 1 with a straight circumferential groove 3 having groove flanks 3a and with an inventive wiper rib member 5. The transverse grooves 8a and 8b which partition the upper portion of the wiper rib member 5 are slanted relative to the axis A (axial direction). In the exemplified embodiment the slant angle μ is 30°. According to a preferred embodiment the orientation of transverse grooves alternates and follows the pattern right-left-right-left and so forth. The section line for the of the associated FIG. 3b is indicated by the dash-dotted line.

Figure 3B:
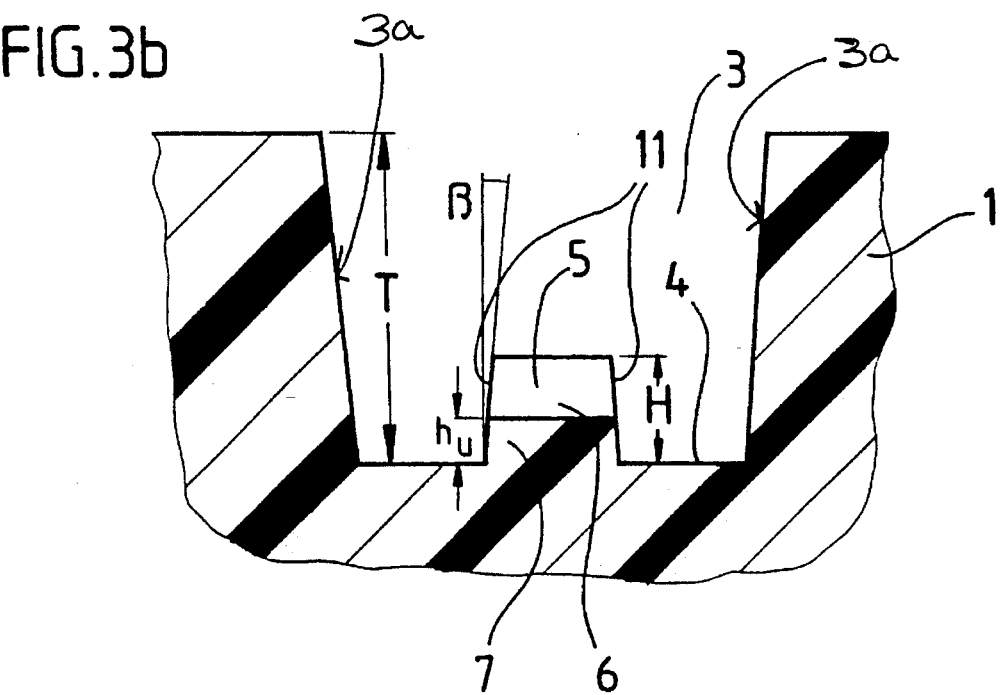

FIG. 3b illustrates a cross-sectional view of the same tire section as shown in FIG. 3a. The circumferential groove 3 of the tire 1 has a tread depth T which here is 22 mm; this is a standard value for modern heavy truck tires. Measured from the base 4 of the groove 3, the wiper rib member 5 has a total height H, measured form the base 4 of the groove 3 which is 7 mm in the shown embodiment, i.e., this is 31.8% of the tread depth T as manufactured. According to the invention the wiper rib member 5 provides an upper portion 6 in which the wiper rib member 5 is divided into member sections 5a of a trapezoidal contour and a lower continuous (undivided) portion 7. The height $h_u$ of the lower portion 7 is 3 mm, i.e., 13.6% of the tread (groove) depth T. The lateral surfaces 11 of the wiper rib member 5, also called wiper flanks, are provided with a rake β relative to the radial; in this embodiment the rake β is 5°.

Figure 4:
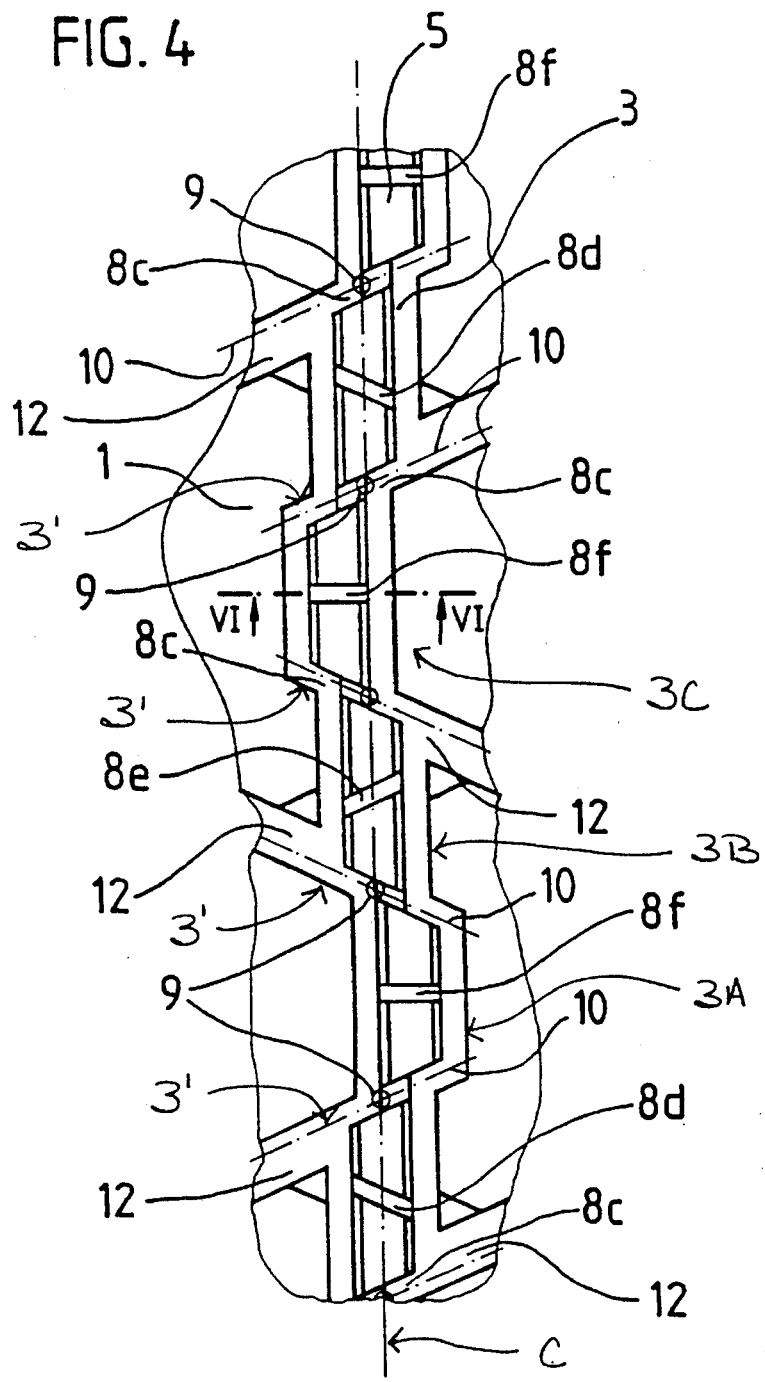
FIG. 4 illustrates a plan view of a section of a tire with a traction tread, the section being a little larger than a periodic length of an inventive zigzag circumferential groove.

FIG. 4 illustrates a plan view of a section of a tire 1 with a traction tread, wherein the shown section is a little larger than one periodical length repeat of an inventive zigzag-shaped circumferential groove 3 having a portion 3B symmetrical to a center line C of the circumferential groove 3 and portions 3A and 3C offset to either side of the center line C. The offset locations of the circumferential groove 3 are labeled with the reference numeral 9. At each offset location 9 a transverse tread groove 12 opens into the circumferential groove 3 from one side. The wiper rib member 5 divided only at its upper portion 6 by transverse dividing grooves 8 follows the course of the groove 3. The transverse dividing grooves 8 are differentiated further by adding a letter to the numeral in order to describe their sequence.

The reference numeral 8c indicates each dividing groove located at each offset location 9. The grooves 8c are aligned with the offset portions (slanted areas 3' of the grooves 3) themselves such that common lines 10, acting practically as a hinge axis, are created at these locations 9 in order to provide an increased bending softness (reduced bending resistance). The orientation of the (hinge axis) common lines 10, and thus also of the grooves 8c, alternates relative to the axial direction but not by following the simple pattern right-left-right-left and so forth, but by following the pattern right-right-left-left-right-right-left-left and so forth. Between each of two grooves 8c which are oriented alike, a groove 8d, respectively, 8e is located for further softening and for saving material. These grooves 8d, 8e are oriented in the opposite direction and are not aligned with the respective off-set portions of the circumferential groove 3. Between each of two oppositely-oriented grooves 8c an exactly axially aligned groove 8f is provided.

Each of these grooves 8 which divide the wiper rib member 5 do not reach down to the base of the groove 3 but, according to the present invention, only divide its upper portion 6.

Figure 5:
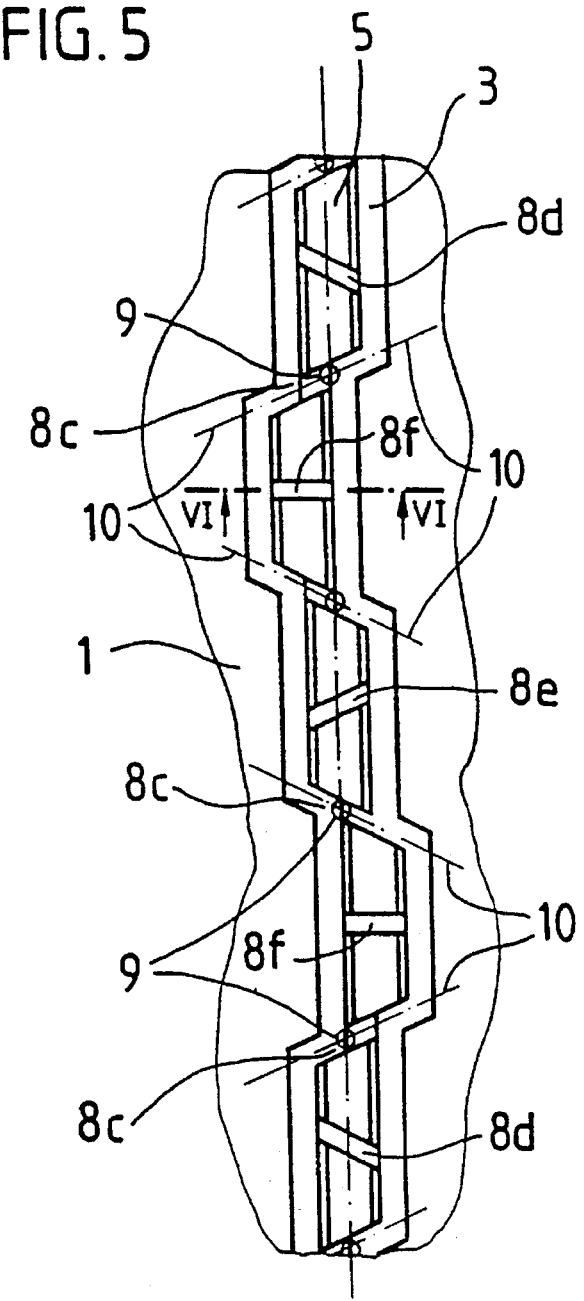
FIG. 5 illustrates a section of a tire for non-driven axles.
Figure 6:
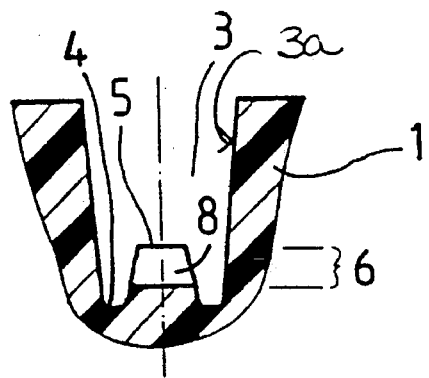

Analogously to FIG. 4, FIG. 5 illustrates a section of a tire for non-driven axles. Here, in contrast to the embodiment of FIG. 4, no transverse tread grooves lead to the circumferential groove 3. However, the sequence of the transverse dividing grooves 8 which, according to the invention, only divide the upper portion of the wiper rib member, is the same as in FIG. 4: 8d, 8e, and 8f.

Figure 6:
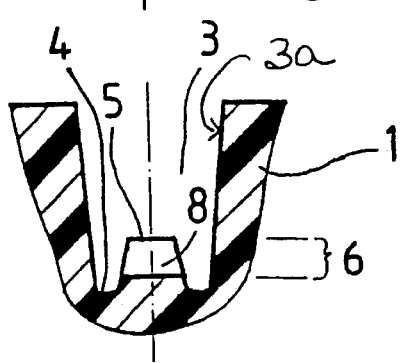
FIG. 6 illustrates a part-cross-sectional view of an inventive tire in the area of a circumferential groove according to FIG. 4 or FIG. 5.

FIG. 6 illustrates a part-cross-sectional view of an inventive tire 1 in the area of a circumferential groove 3. Since this cross-section corresponds to the cross-sectional embodiment illustrated in FIG. 4 as well as to the one in FIG. 5, it is illustrated at the bottom of either drawing sheet for a better understanding of FIGS. 4 and 5. Relatively steep groove flanks 3a are provided which provide for a minimal reduction of the negative volume as a function of the decreasing groove depth, whereas the flanks of the wiper rib members 5 are provided with a greater gradient relative to the radial. According to the invention, the grooves 8 dividing the wiper rib member 5 do not reach down to the base 4 of the groove 3 but only divide its upper portion 6.

The invention requires only a slightly increased expenditure for manufacturing the required vulcanization molds. In the mass production of tires this expenditure will be more than compensated by saving rubber material. At the same time, the tire properties are improved: the rolling resistance is slightly reduced and the stone clearing action, respectively, the barrier for stone migration is undiminishedly good.

Furthermore, the risk of a crack formation at the base of the groove and the risk of a tear-off of the wiper rib member are significantly reduced by the present invention in comparison to the known wiper-rib members provided with dividing grooves extending to the base of the groove.

The present invention is, of course, in no way restricted to the specific disclosure of the specification, examples and drawings, but also encompasses any modifications within the scope of the appended claims.

What we claim is:

1. A pneumatic vehicle tire comprising:

a tire tread comprising circumferential grooves extending in the circumferential direction of said tire;

each one of said circumferential grooves having a groove base and groove flanks;

at least one of said circumferential grooves comprising a wiper rib member connected integrally to said groove base and extending over the entire circumferential length of said circumferential groove such that said wiper rib member is connected in the radial direction of said tire to said groove base but is separate from said groove flanks in the axial direction of said tire;

said wiper member having, when viewed radially outwardly, a lower portion and an upper portion, wherein said upper portion is divided by transverse grooves into member sections and said lower portion is continuous in said circumferential direction;

wherein said transverse grooves comprise a first and second set of grooves which are slanted at an angle of 10° to 40° relative to said axial direction with the grooves of the first set oriented opposite to the grooves of the second set;

wherein a height of said lower portion of said wiper rib member measured from said groove base radially outwardly is 5% to 20% of a maximum groove depth of said circumferential grooves; and wherein said circumferential grooves extend in a zigzag pattern so as to comprise groove portions that are offset at an offset location in said axial direction relative to a circumferential center line of said circumferential grooves and comprise slanted areas extending at a slant to said circumferential center line, wherein at each one of said offset locations one of said transverse grooves is arranged such that at said offset locations said transverse grooves and said slanted areas are aligned with one another along a common line acting as a hinge axis about which a bending softness of said circumferential grooves is increased.

2. A pneumatic vehicle tire according to claim 1, wherein a total height of said wiper rib member measured from said groove base radially outwardly is 15% to 35% of said maximum groove depth.

3. A pneumatic vehicle tire according to claim 1, wherein a height of said lower portion of said wiper rib member measured from said groove base radially outwardly is 1.8 mm and wherein said lower portion serves as a tread wear indicator.

4. A pneumatic vehicle tire according to claim 1, wherein said wiper rib member has flanks having a slant such that said wiper rib member tapers radially outwardly, wherein a slant angle of said flanks relative to said radial direction is between 0° and 30°.

* * * * *